Dec. 16, 1958  K. A. KLINGLER  2,864,258
SEALING MEANS FOR RECIPROCATING MEMBERS
Filed Aug. 1, 1955  3 Sheets-Sheet 1

Inventor
Karl A. Klingler
by Parker & Carter
Attorneys

Dec. 16, 1958 K. A. KLINGLER 2,864,258
SEALING MEANS FOR RECIPROCATING MEMBERS
Filed Aug. 1, 1955 3 Sheets-Sheet 2

Inventor
Karl A. Klingler
by Parker & Carter
Attorneys

Dec. 16, 1958 K. A. KLINGLER 2,864,258
SEALING MEANS FOR RECIPROCATING MEMBERS
Filed Aug. 1, 1955 3 Sheets-Sheet 3
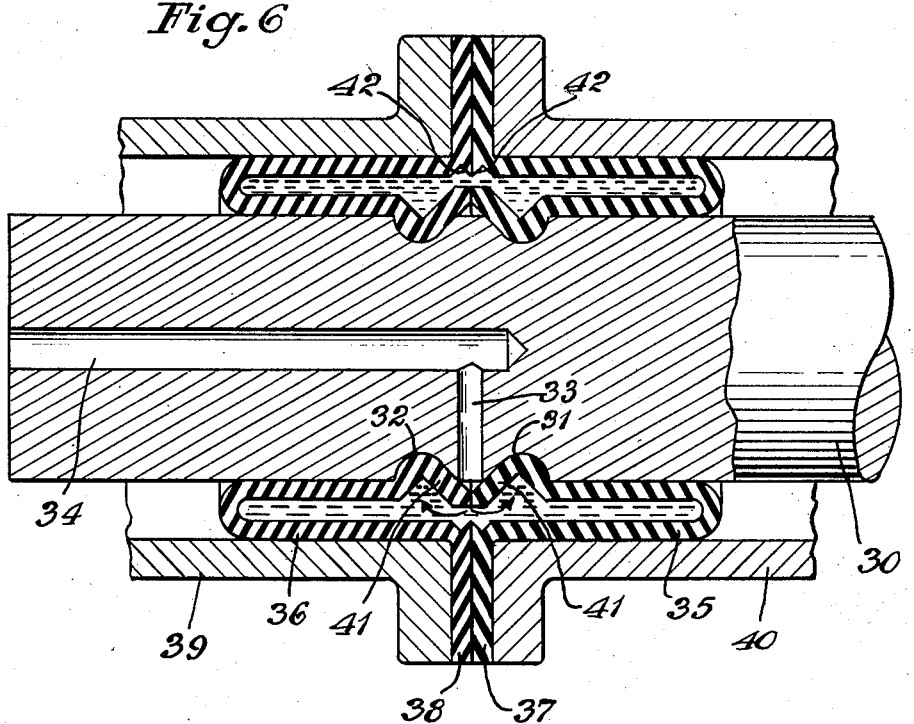
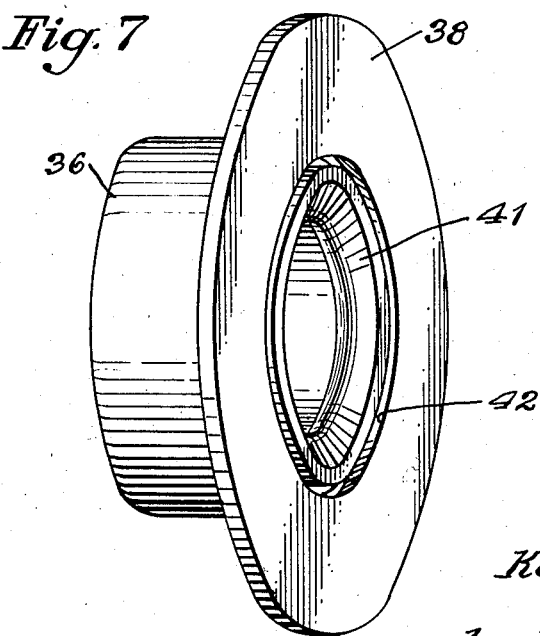
Inventor
Karl A. Klingler
by Parker & Carter
Attorneys

United States Patent Office 2,864,258
Patented Dec. 16, 1958

2,864,258

SEALING MEANS FOR RECIPROCATING MEMBERS

Karl A. Klingler, Naperville, Ill.

Application August 1, 1955, Serial No. 525,597

6 Claims. (Cl. 74—18.2)

My invention relates to improvements in sealing means for reciprocating members and has for one object to provide a sealing or packing means for such a reciprocating member as a piston, a piston rod, a valve stem, or the like, where in the absence of complete destruction of the packing or sealing means, no leakage whatever can take place.

Another object of my invention is to provide packing or sealing means for such reciprocating objects wherein substantially the only friction or resistance to reciprocating movement is hydraulic friction.

Another object of my invention is to provide such a type of packing or sealing means as will require a minimum of accurately finished parts.

Other objects will appear from time to time throughout the specification and claims.

I have illustrated my invention as applied to a reciprocating part such as a valve stem but it will be quite obvious that it might equally well be applied to a multitude of other reciprocating members which may be subjected to pressure from either or both directions generally parallel to the line of reciprocation.

My invention is illustrated more or less diagrammatically in the accompanying drawings, wherein Figure 1 is a longitudinal section of an illustration of my device;

Figure 6 is a section similar to Figure 1 illustrating a further exemplification of my invention; and Figure 7 is a perspective view of one of the sealing elements of Figure 6.

Like parts are indicated by like characters throughout the specification and drawings.

Figure 1:
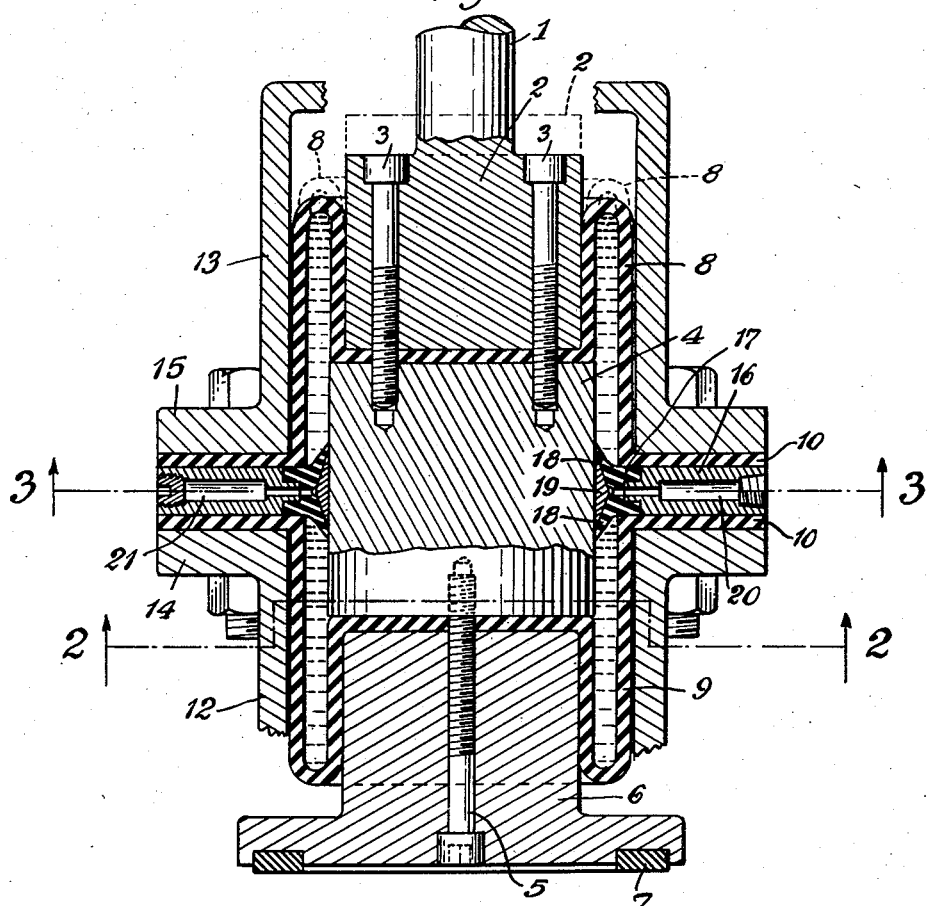

1 is a reciprocable valve stem, the means for manipulating, forming no part of the present invention, are not here shown. The stem, in this case is to be sealed against pressure from one side only. 2 is an enlarged head attached by screws 3 to a reciprocating body 4. The reciprocating body 4 is attached by a screw 5 to a valve member 6 shown with a valve seat contacting ring 7, the valve seat itself being not illustrated.

8 and 9 are two sleeves which may be of elastomeric or rubber-like flexible and stretchable material. Each sleeve is flanged about its open mouth as at 10 and apertured to permit entrance of the screws 3, 5. The housing enclosing seal comprises two generally cylindrical parts 12, 13, flanged at 14, 15. 16 is a filler ring adapted to be held between the flanges 10. Welded or cemented or otherwise permanently attached to the filler ring 16 is elastomeric packing ring 17 having outwardly extended, thin, tapered flanges 18 which extend in opposite directions and engage the surface of the cylindrical member 4. Under some circumstances there may be interposed between the member 4, the flanges 18 and the member 17 a metal reinforcing ring 19.

20 is a filler tube extending radially through the ring 16 into the space between the flanges 18. Hydraulic fluid of any suitable viscosity may be forced inwardly through the filler tube 20 and flow circumferentially around the member 4 and longitudinally in opposite directions from such circumferential flow past the lips 18 to fill the bag-like space between the member 4 and the sleeves to expand them against the inner wall of the housings 12, 13. 21 is a bleeder tube through which air may be expelled as the bag-like space is filled with the hydraulic fluid so that the space will be completely filled with the fluid and not with air. In assembly the sleeves 8 will be collapsed to a smaller radial dimension than shown in Figure 1 and engagement with the housings 12, 13 by the outer wall of the bag or bladder or member 8 limits the radial expansion of the bag. Until the bag is completely filled and the desired hydraulic pressure has been applied, the assembly will when charged thus assume the position shown in Figure 1. The tubes 20 and 21 may then be closed by any suitable plug in the usual manner.

Under these circumstances when the elements 1, 2, 4 and 6 reciprocate the insulating bag or pocket will roll from contact with the inner radial surface to contact with the outer radial surface of members 2 or 6 and 13 and 12 without any friction except the internal rolling friction of the elastomeric bag and the liquid or fluid contained within the bag.

Figure 4:
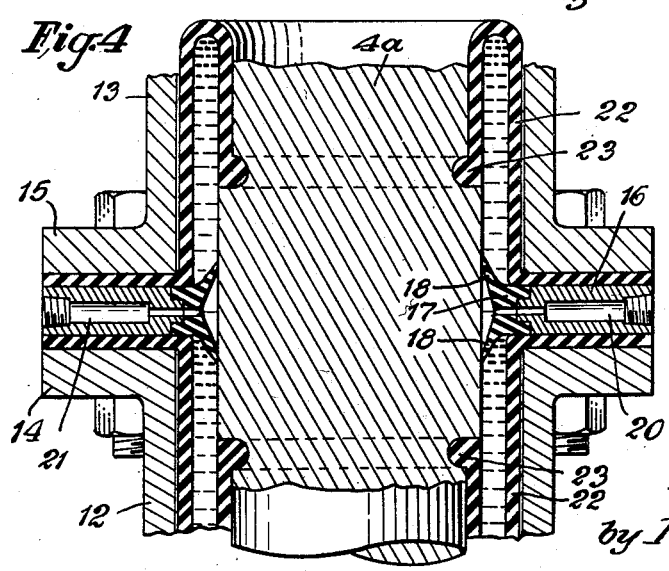
Figure 4 is a detail section similar to the section of Figure 1 showing a modified form.
Figure 2:
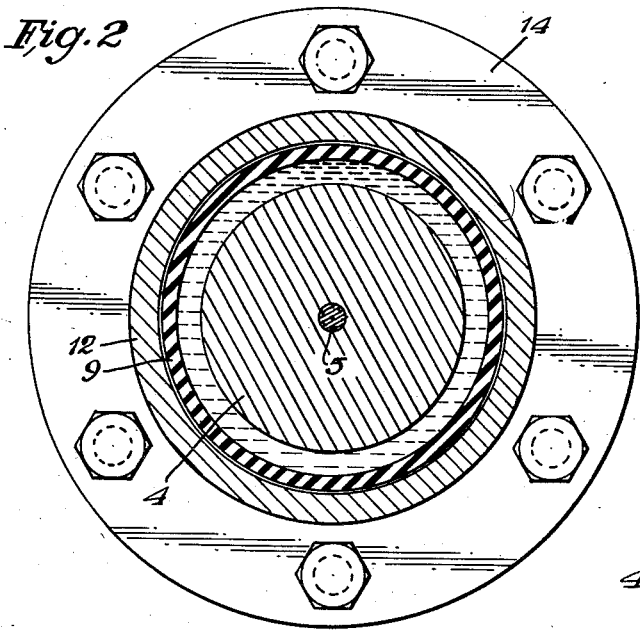
Figure 2 is a section along the line 2—2 of Figure 1.

In the modified form shown in Figure 4, the reinforcing ring 19 is omitted. If very high pressures are anticipated, it may be desirable to reinforce the flanges 18 by the ring 19. When lower pressures are expected, this reinforcing ring may be omitted.

Also in Figure 4 it will be noted that there is substituted for the bag-like element or sleeve 8 and 9 an open ended sleeve 22 which terminates at the end furthest from the flange 10 in a bead 23 which penetrates a groove in the cylindrical inner member 4a, the sleeve being of slightly less diameter than the member 4a so that it hugs it tightly. Under these circumstances, the screws 3 and 5 may be omitted and the cylindrical member 4a may extend clear through the housing.

Figure 5:
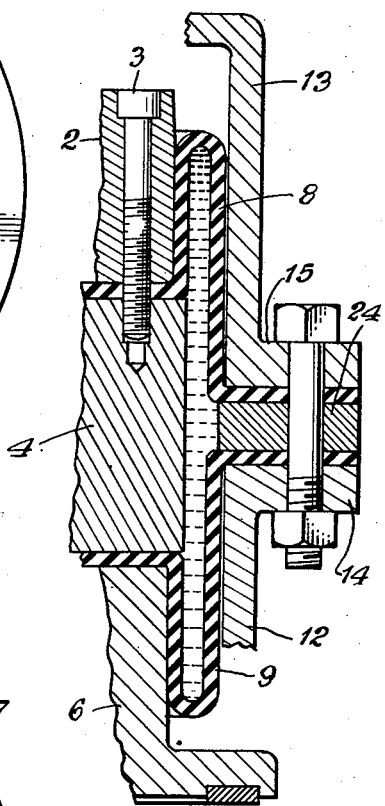
Figure 5 is a section similar to Figure 1 showing a further modified form.
Figure 3:
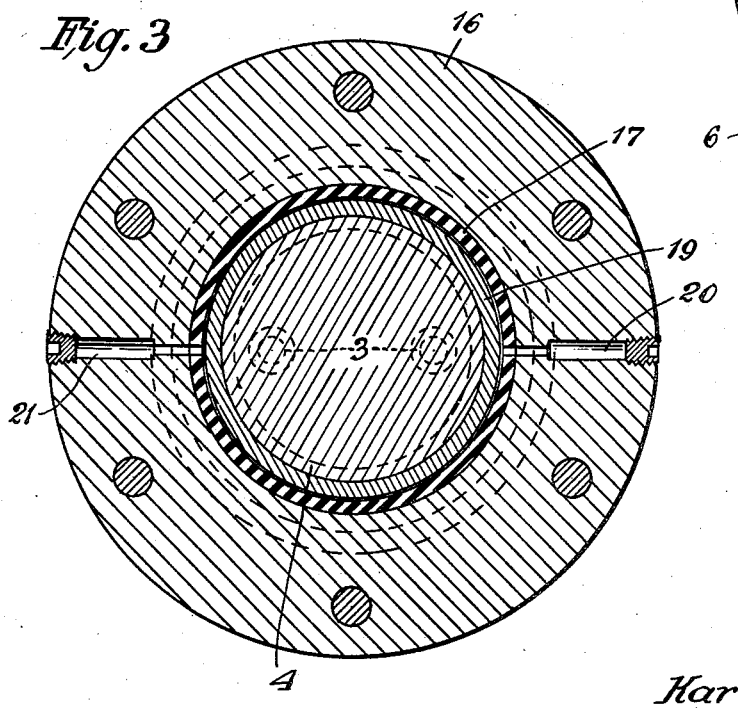
Figure 3 is a section along the line 3—3 of Figure 1.

In the modified form of Figure 5, there is substituted for the filler ring 16 and elastomeric packing ring 17 a single filler ring 24 which filler ring does not contact the member 4a. Under these circumstances there is free and unobstructed passage of the hydraulic fluid between the pockets on either side of the filler ring 16 or 24. This latter modification is adapted for situations where even lower pressures than that of Figure 4 are to be expected.

In each case the bag or pocket is filled with hydraulic fluid in the same way, any air being permitted to escape through the bleeder tube whereupon both tubes are closed to lock the hydraulic fluid in the system.

In the device of Figures 6 and 7, the reciprocating member 30 has intermediate its ends two adjacent peripheral parallel grooves 31, 32 about its outer circumference. One or more radial passages 33 communicating with a longitudinal passage 34 in the member 30 are open to the surface of the member 30 between the grooves 31, 32 and the end of the passage 34 is open to the high pressure side of the system.

Two separate sealing sleeves of rubber or elastomeric flexible material 35 and 36 are each flanged at 37 and 38, are clamped between the abutting flanges of aligned cylinders 39 and 40 by any suitable means not here illustrated. The cylinders are concentric with the reciprocating member 30 and the clearance between the inner peripheries of the cylinders and the outer periphery of reciprocating member 30 is just sufficient to permit the two sealing sleeves to be folded upon themselves as indicated with such clearance between their inner opposed surfaces that actual contact does not occur when the outer surfaces of the sleeve engage respectively the inner walls of the cylinder and the outer walls of the reciprocating member. Beads or flanges 41 about the smaller diameter of each of the sleeves engage and fill the grooves 31, 32 respectively so that the small ends of the two opposed sleeves abut masking the opening of the passage 33. Sealing lips 42 are so disposed that pressure in the space within the two folded back sleeves close the sealing lips to prevent leakage between the flanges 37, 38 and pressure brings the heads or flanges 41 together so as to prevent outward movement between them.

When the device is assembled and pressure is applied, liquid or fluid as the case may be flows to the pressure side of the system, the liquid or fluid travels inwardly through the passages 34, 33 to the clearance between the grooves and enters the pocket defined by the two folded back sleeves, the abutting ends of the sleeves yielding to permit such entry. However, if pressure drops on the outside, the pressure in the bag defined by the two sleeves causes the opposed sleeve ends to engage one another and seal.

By this arrangement, the necessity of providing any additional means to fill the space within the sleeve bag is obviated, the material being pumped or under pressure, enters the system, penetrates and inflates the bag and holds the two opposed bag walls apart sufficiently to prevent frictional contact between them. Since the outer surfaces of the bag are always in contact either with the inner or outer peripheral walls of cylinder and plunger or reciprocating member, pressure is resisted and substantially the entire body of the rubber-like sealing bag is constantly available to maintain the pressure. Reciprocating movement of the plunger 30 with respect to the cylinders merely changes the position of the bag but since both ends of the bag are in direct communication, the volume and capacity of the bag is not changed and the pressure on the high pressure side insures that the bag will always be inflated or distended to fill the bag so that relative reciprocation of the parts may take place, merely flexing the bag and causing it to roll back and forth in contact with one or the other of the surfaces.

In operation the pressure of the fluid in the sealing bag will normally maintain a close contact between the sealing member and the rigid surfaces opposed to it so that friction between the bag and the enclosing surfaces assists in supporting a pressure load applied parallel to the axis of reciprocation. There is normally no sliding movement between the flexible sealing element and the rigid surfaces. As the parts reciprocate the bag rolls into and out of contact with one or the other of the surfaces.

I have shown sufficient clearance between the opposed inner surfaces of the bag to provide space for the hydraulic fluid. The clearance is exaggerated in the drawings for clarity, but it is only necessary that the clearance be sufficient to permit the hydraulic fluid to penetrate between the opposed walls of the bag and hold them apart sufficiently to prevent contact.

The use and operation of my invention are as follows:

My seal comprising a generally annular, flexible and extensible pouch or bag of rubber-like or elastomeric, material contained within an annulus which is bounded on opposite sides by the inner walls of the cylinder and the outer walls of the filler. The cylinder and filler are out of contact with each other and are mounted for relative reciprocation parallel with the cylinder axis. The outer periphery of the bag is attached to the inner wall of the cylinder, the inner periphery of the bag to the outer wall of the filler so that as relative reciprocation occurs, the bag walls may roll into and out of contact respectively with the inner and outer walls of the annulus.

Since the bag is permanently attached in fluid tight contact, at widely spaced points, to the two elements defining the annulus, no leakage through the annulus past the bag can take place without rupture of the bag.

The bag is completely filled with an incompressible hydraulic fluid. In one exemplification, the bag is divided between its ends and movement of hydraulic fluid from one end to the other is prevented. In the other case, the bag is open from end to end and movement of hydraulic fluid from end to end may take place.

Considering the drawings, if the filler moves to the right, the bag will roll from contact with the filler to contact with the cylinder at the right hand end and at the left hand from contact with the wall of the cylinder to the surface of the filler. Any change in the volume will be compensated for by expansion or contraction of the extensible bag body because the lips around the center of the reciprocating filler prevent movement of liquid from one chamber to the other. In Figure 5 the lips are absent and no change in the capacity of the bag takes place.

Pressure applied to the bag compresses it and expands it against both walls of the annulus. Reduction in pressure permits the bag wall to come in part out of contact with the annulus but movement of the bag walls never causes separation of the bag from its central anchorage on the two walls of the annulus. Therefore, there can be no leakage.

The bag-like structure may engage both inner and outer walls of the annular ring or it may engage only the inner wall of the annular ring. If the latter is the case, then pressure on the upstream or pressure side of the annular ring will apply pressure against the cylindrical outer wall of the bag. Hydraulic pressure applied to the liquid on the high pressure side will expand the bag to cause both the inner and outer peripheries to engage the opposite inner and outer walls of the annular chamber. No transverse or longitudinal movement of the rubber is involved. The rubber bag is merely pressed against the inner and outer peripheries by the pressure applied to the hydraulic fluid. The curved portion of the bag extending between the inner and outer walls will resist the hydraulic pressure. If the hydraulic pressure increases then that curve will be stretched. This causes both sides of the bag to engage the inner and outer peripheries of the annulus at a point a little further away from the direction from which the pressure comes but the stretching will be resisted by the high tensile character of the rubber-like bag and provided the pressure is not great enough, there is never any situation where there can be anything except rolling friction between the inner and outer walls of the bag and the inner and outer walls of the rigid annulus.

If pressure great enough to burst the bag are to be expected, then it becomes necessary to place intermediate the two ends of the bag, the flexible lip which is self-sealing which will be in frictional engagement with the moving element but only at the point where that sliding lip is engaged. Pressure then applied to the high pressure side will merely cause that lip to engage the movable member and resist pressure, thus protecting the lower pressure side from the excess pressure. If even greater pressures are expected, then it will be desirable to put between the two lips the metal reinforcing ring so that the lips themselves will be reinforced.

When the high pressure and low pressure sides of the bag are separated by these lips or by the lips and the ring, any change in the volumetric capacity of the bag on the low pressure side will merely result in withdrawing the bag from contact with one other or both of the annular walls of the housing. This situation prevails only with respect to the low pressure side when there is no free passage of hydraulic fluid from the high pressure to the low pressure side.

In one form of my invention I have disclosed the bag including the diaphragm extending clear across the end of the reciprocating member with holes through it to permit attachment. That diaphragm might have but a single hole and under some circumstances the diaphragm itself might be open throughout substantially its entire area having a bead, which bead and the hose-like portion of the bag adjacent the diaphragm would both be of smaller diameter than the cylindrical member on which they are mounted. In this case, the tension of the rubber or rubber-like material would cause the necessary contact between the bag and the reciprocating member so that as pressure built up, the bag would be squeezed harder and harder against the cylindrical member to make a tighter and tighter leak preventing fit.

In some respects my seal resembles a diaphragm seal because it is in fluid tight connection at its center and at its outer periphery respectively with the two moving members. However, the diaphragm can yield only by stretching or bending and must support the pressure differential over the entire area between said two supports. Moreover, to prevent stretching or bending beyond the safety point the relative excursion of the moving members is sharply limited.

In my seal the differential pressure is resisted not by the rubber bag but by the hydraulic fluid itself. The rubber bag merely holds the fluid in place in the annular chamber to cause it to support the pressure. As the parts move the bag walls roll from contact with one part into contact with the other. A wide range of movement is possible without unduly stretching the bag even though relative movement of the parts may cause a slight change in the volumetric capacity of the bag as the hydraulic fluid itself moves axially in the annular chamber.

I have illustrated my invention in a cylindrical housing with a cylindrical filler member defining with the housing an annular chamber to enclose the sealing bag. The reciprocating members in the sealing zone are out of contact with each other. The flexible rolling bag and its hydraulic fluid filling is the sole sealing means and the only resistance to movement is the hydraulic friction of the fluid and the bending of the bag as it rolls from one surface to another in response to relative lateral displacement of the sealed parts. Preferably the chamber containing the bag is a true annulus bounded on outside and inside by concentric cylindrical surfaces. The sealing effect would be the same if the cylindrical surfaces were eccentric or if they were polygonal. I have used the term "annulus" therefore in a general sense, to cover any chamber whether the surfaces are cylindrical or polygonal or are concentric or eccentric or not, so long as there is always a space between the inner and outer walls of the chamber, the entire cross sectional area of which is closed by the fluid filled bag which can roll between the surfaces as relative reciprocation occurs.

I claim:

1. Sealing means for reciprocating members such as valve stems and the like comprising an annular fluid-tight bag of flexible, extensible, elastomeric material filled with a body of incompressible hydraulic fluid, a cylindrical housing enclosing the bag, a body extending through the bag to define with the housing an annular chamber, the bag being held in fluid-tight contact with the inner wall of the housing and the outer wall of the body, the surfaces of the bag being free to roll into and out of contact with the opposed surfaces of the annular chamber as relative longitudinal displacement of the housing and the filler occurs, means, intermediate the ends of the bag, to prevent axial fluid movement from one end of the bag to the other.

2. Sealing means for reciprocating members such as valve stems and the like comprising an annular fluid-tight bag of flexible, extensible, elastomeric material filled with a body of incompressible hydraulic fluid, a cylindrical housing enclosing the bag, a body extending through the bag to define with the housing an annular chamber, the bag being held in fluid-tight contact with the inner wall of the housing and the outer wall of the body, the surfaces of the bag being free to roll into and out of contact with the opposed surfaces of the annular chamber as relative longitudinal displacement of the housing and the filler occurs, means, intermediate the ends of the bag, to prevent axial fluid movement from one end of the bag to the other, said means including a radial wall extending across the bag fixed in one wall and axially movable with respect to the other wall of the annulus, the radial wall terminating in a thin circular flexible elastomeric lip adapted to be constricted by hydraulic pressure to seal the periphery of the radial wall, a metal reinforcing ring, encircling the filler, in contact with and supporting the lip.

3. Sealing means for reciprocating members such as valve stems and the like comprising an annular fluid-tight bag of flexible, extensible, elastomeric material filled with a body of incompressible hydraulic fluid, a cylindrical housing enclosing the bag, a body extending through the bag to define with the housing an annular chamber, the bag being held in fluid-tight contact with the inner wall of the housing and the outer wall of the body, the surfaces of the bag being free to roll into and out of contact with the opposed surfaces of the annular chamber as relative longitudinal displacement of the housing and the filler occurs, means, intermediate the ends of the bag, to prevent axial fluid movement from one end of the bag to the other, said means including a radial wall extending across the bag fixed in one wall and axially movable with respect to the other wall of the annulus, the radial wall terminating in two thin oppositely extended circular flexible elastomeric lips adapted to be constricted by hydraulic pressure to seal the periphery of the radial wall, a metal reinforcing ring encircling the filler between, in contact with and supporting both lips.

4. Sealing means for relatively reciprocable members are one inside the other, including an elongated annular flexible, expansible, elastomeric bag encircling the inner member and contained within the outer, having opposed walls in fluid-tight connection about their entire peripheries with each of them intermediate the ends of the bag, the bag being filled with an incompressible hydraulic fluid and free to roll into and out of contact with the opposed surfaces of the inner and outer members as the two reciprocate relative to one another.

5. Sealing means for relatively reciprocable members one inside the other, including an elongated annular flexible, expansible, rubber-like bag encircling the inner member and contained within the outer, having opposed walls in fluid-tight connection about their entire peripheries with each of them intermediate the ends of the bag, the bag being filled with a hydraulic fluid and free to roll into and out of contact with the opposed surfaces of the inner and outer members as the two reciprocate relative to one another, the bag comprising two separate abutting sleeves, and a pressure connection between the interior of the inner reciprocable member and the interior of the bag.

6. Sealing means for relatively reciprocable members one inside the other, including an elongated annular flexible, expansible, rubber-like bag encircling the inner member and contained within the outer, having opposed walls in fluid-tight connection about their entire peripheries with each of them intermediate the ends of the bag, the bag being filled with a hydraulic fluid and free to roll into and out of contact with the opposed surfaces of the inner and outer members as the two reciprocate relative to one another, the inner reciprocable member having two spaced grooves, the rubber-like bag comprising a pair of open ended sealing sleeves, one end of each sleeve being anchored on the outer member, the other end of each sleeve penetrating one of the grooves, said sleeve ends abutting between the grooves.

References Cited in the file of this patent

UNITED STATES PATENTS

| | | |
|---|---|---|
| 2,523,716 | Parr | Sept. 26, 1950 |
| 2,702,023 | Seeloff | Feb. 15, 1955 |
| 2,757,542 | Klingler | Aug. 7, 1956 |

FOREIGN PATENTS

| | | |
|---|---|---|
| 118,901 | Switzerland | Feb. 16, 1927 |